(12) United States Patent
Louis et al.

(10) Patent No.: US 8,636,472 B2
(45) Date of Patent: Jan. 28, 2014

(54) BLADE DAMPER, AND A ROTOR FITTED WITH SUCH A DAMPER

(75) Inventors: Charles Louis, Aix en Provence (FR); Matthieu Ferrant, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 369 days.

(21) Appl. No.: 13/071,366

(22) Filed: Mar. 24, 2011

(65) Prior Publication Data

US 2011/0236209 A1 Sep. 29, 2011

(30) Foreign Application Priority Data

Mar. 29, 2010 (FR) ...................................... 10 01252

(51) Int. Cl.
*B64C 27/51* (2006.01)

(52) U.S. Cl.
USPC .......................................... 416/106; 416/140

(58) Field of Classification Search
USPC .................. 416/103, 106, 107, 135, 140, 500
See application file for complete search history.

(56) References Cited

U.S. PATENT DOCUMENTS

| | | | |
|---|---|---|---|
| 4,369,019 A | 1/1983 | Lovera et al. | |
| 4,549,850 A | 10/1985 | Vincent | |
| 4,580,945 A | 4/1986 | Miller | |
| 4,765,758 A | 8/1988 | O'Donnell et al. | |
| 5,141,398 A | * 8/1992 | Bietenhader et al. | ......... 416/107 |
| 5,449,152 A | 9/1995 | Byrnes et al. | |
| 6,659,839 B2 | 12/2003 | Iwasawa | |
| 6,832,894 B2 | 12/2004 | Levallard et al. | |
| 7,607,892 B2 | 10/2009 | Beroul | |

FOREIGN PATENT DOCUMENTS

| | | |
|---|---|---|
| CN | 1023692 C | 2/1994 |
| CN | 1300338 A | 6/2001 |

(Continued)

OTHER PUBLICATIONS

Search Report and Written Opinion; Application No. FR 1001252; dated Oct. 18, 2010.

(Continued)

*Primary Examiner* — Richard Edgar
(74) *Attorney, Agent, or Firm* — Brooks Kushman P.C.

(57) ABSTRACT

The present invention relates to a damper (10) provided with an inner end strength member (20) and an outer end strength member (30) that are tubular and coaxial, a return member (40) being arranged between the inner end strength member (20) and the outer end strength member (30). The return member (40) includes an intermediate strength member (43) coaxial with the inner and outer end strength members (20, 30), said return member (40) having first and second return means (41, 42), said first return means (41) being arranged between the outer end strength member (30) and said intermediate strength member (43), said second return means (42) being arranged between the inner end strength member (20) and said intermediate strength member (43).

11 Claims, 3 Drawing Sheets

(56) References Cited

FOREIGN PATENT DOCUMENTS

| | | |
|---|---|---|
| CN | 1944185 A | 4/2007 |
| EP | 0233792 A1 | 8/1987 |
| EP | 1767452 A1 | 3/2007 |
| FR | 2333163 A1 | 6/1977 |
| FR | 2592449 A1 | 7/1987 |
| FR | 2653405 A1 | 4/1991 |
| FR | 2839945 A1 | 11/2003 |
| FR | 2929675 A1 | 10/2009 |
| JP | 56154396 A | 11/1981 |
| JP | 11006536 A | 1/1999 |
| JP | 2006090486 A | 4/2006 |
| JP | 381914 B2 | 9/2006 |
| WO | 9415113 A1 | 7/1994 |
| WO | 9835051 A1 | 8/1998 |

OTHER PUBLICATIONS

Chinese Office Action Dated Jan. 16, 2013, Application No. 201110081342.7, Applicant Eurocopter, 15 Pages.
European Communication Dated Aug. 1, 2013, Applicant Europcopter, Application No. 11001485.9-1753 /2371712, 6 Pages.
JP Notice of Reasons for Rejection Dated Aug. 15, 2013, E0303DP001, 542701, 2 Pages.

* cited by examiner

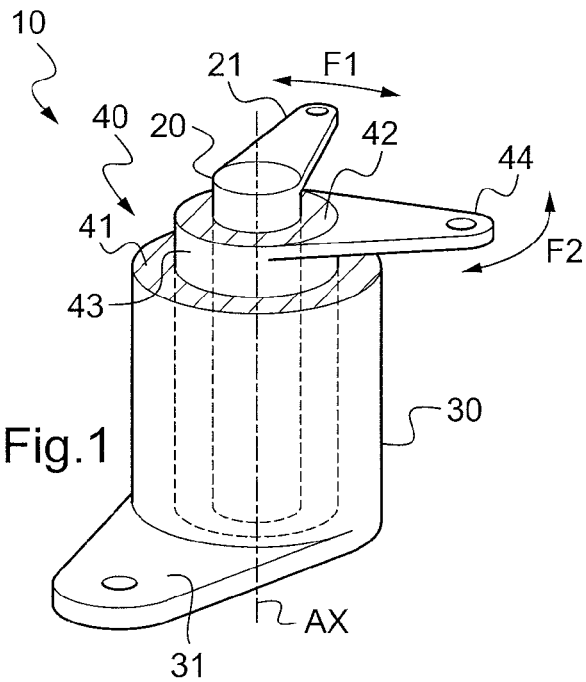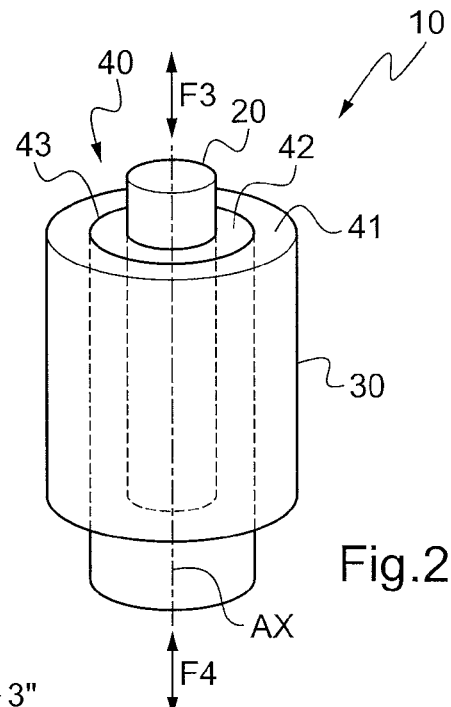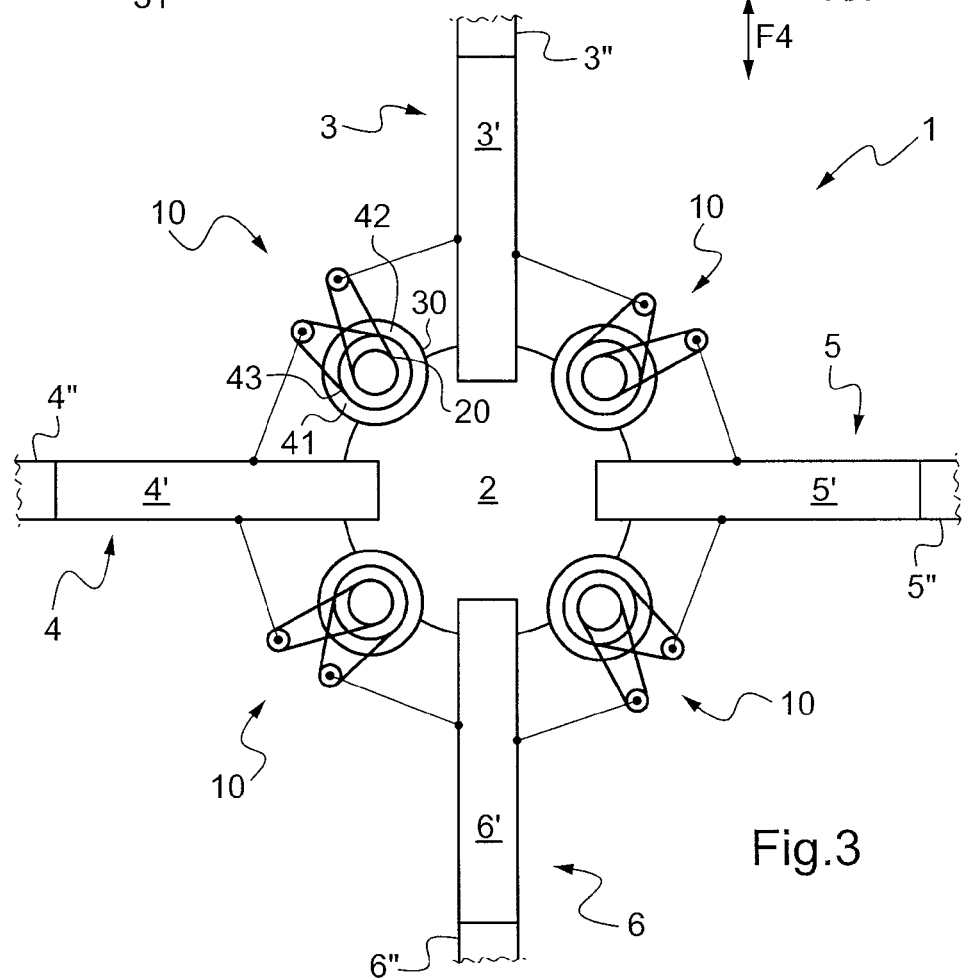

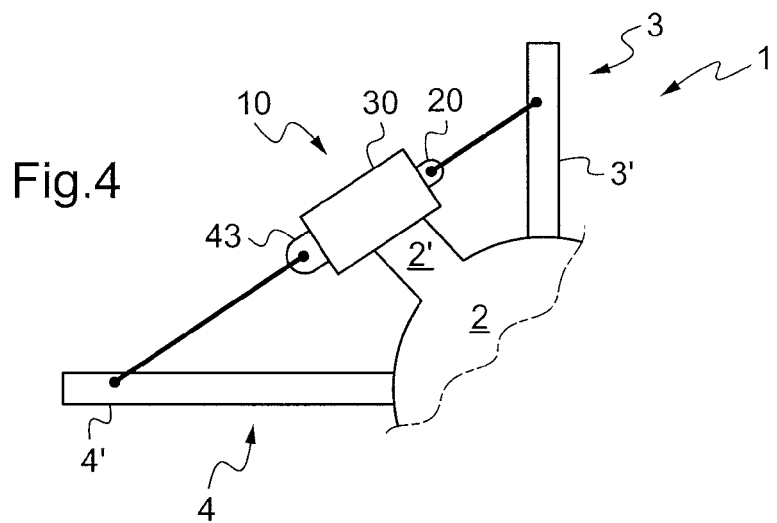
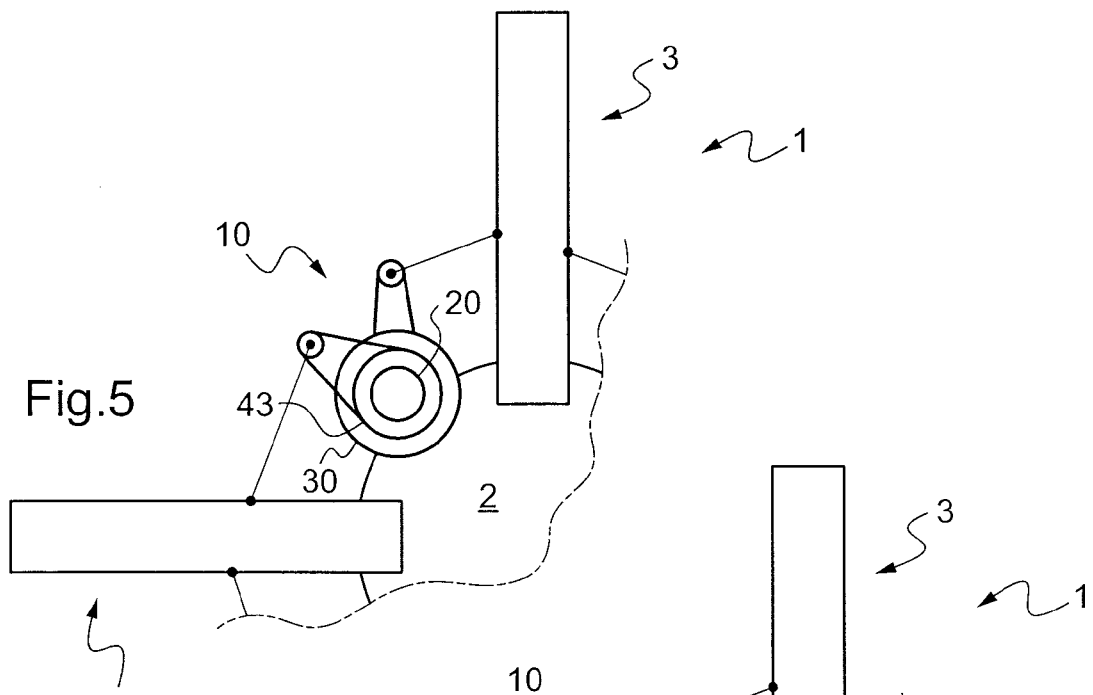
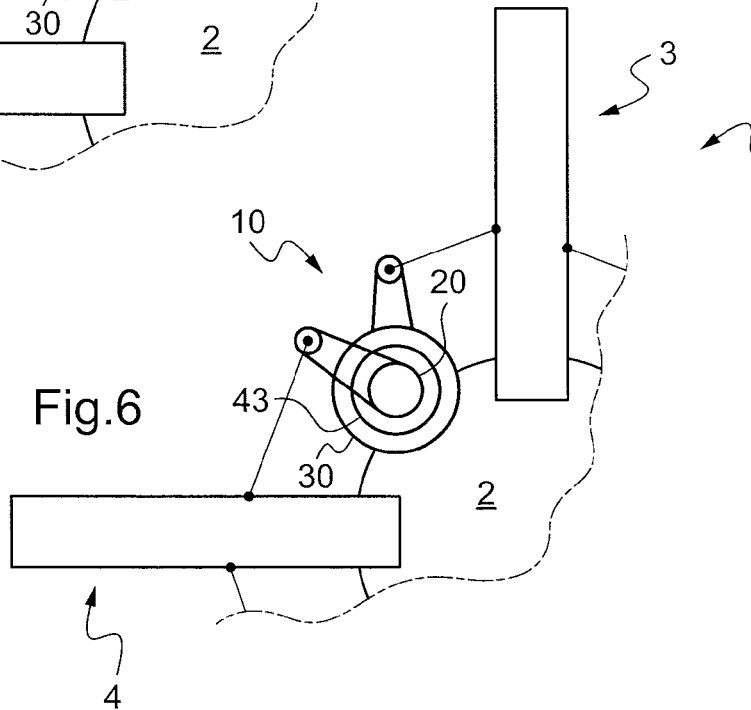

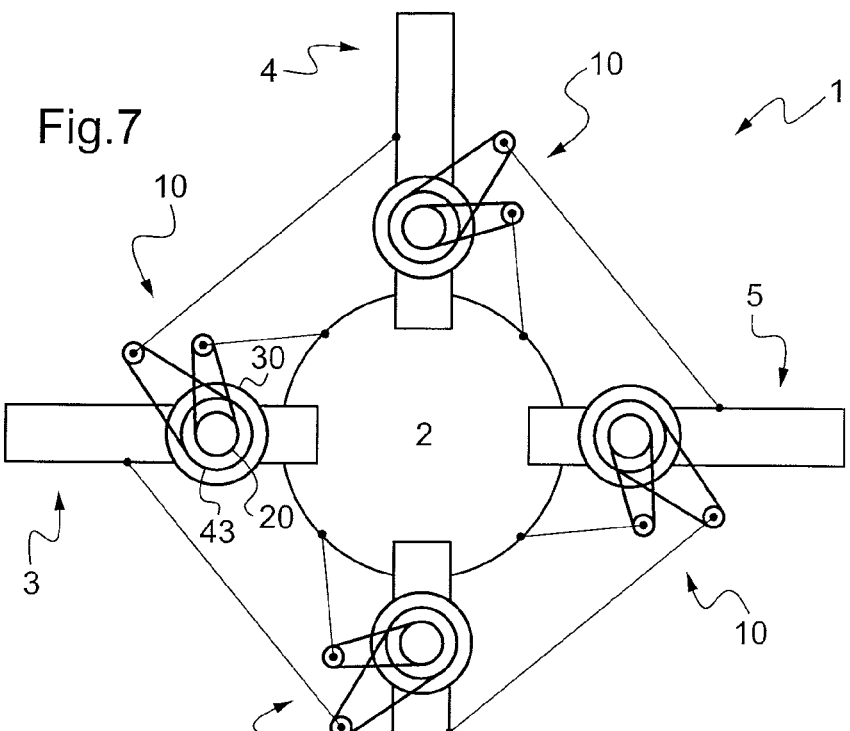
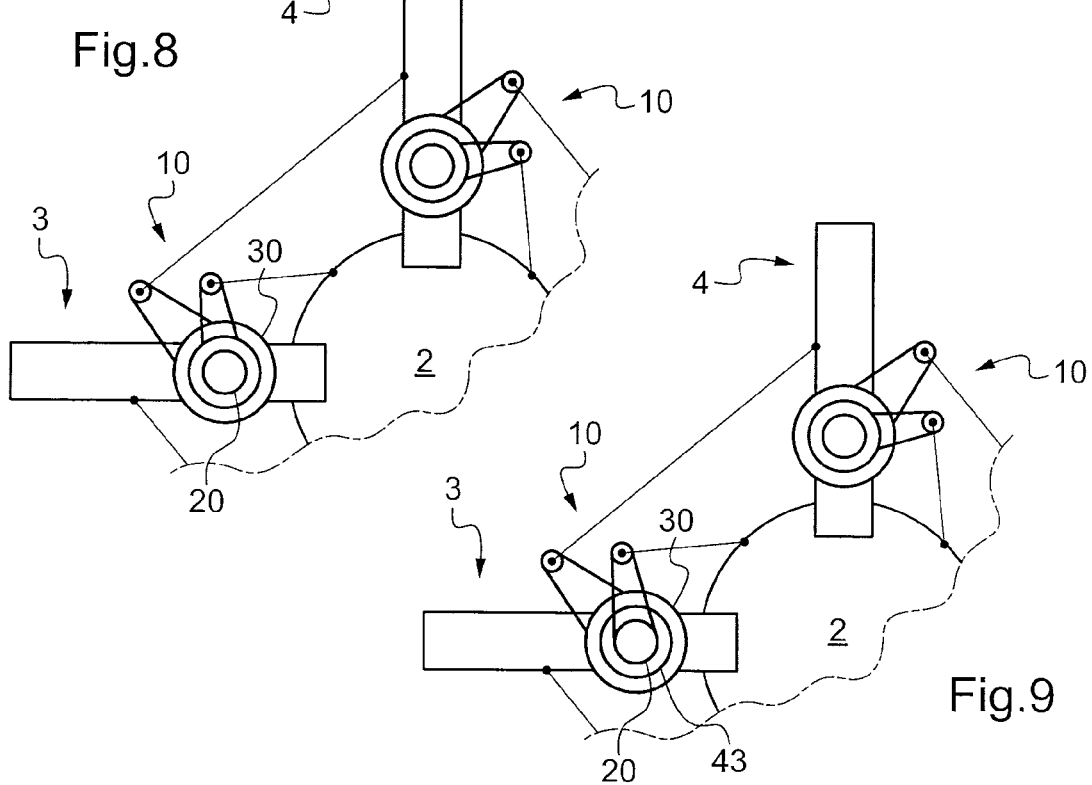

US 8,636,472 B2

BLADE DAMPER, AND A ROTOR FITTED WITH SUCH A DAMPER

CROSS REFERENCE TO RELATED APPLICATIONS

This application claims the benefit of FR 10/01252 filed on Mar. 29, 2010, the disclosure of which is incorporated in its entirety by reference herein.

BACKGROUND OF THE INVENTION (1) Field of the Invention

The present invention relates to a blade damper, and to a rotor fitted with such a damper.

More particularly, the invention lies in the technical field of damping the drag movements of a blade, e.g. a blade of the rotary wing of a rotorcraft.

(2) Description of Related Art

A rotorcraft rotor conventionally comprises a hub driven in rotation about an axis of rotation by an outlet shaft from a power gearbox, together with at least three blades fastened to the hub via suitable hinges, in particular via a dedicated laminated spherical abutment for each blade.

The oscillations of each blade about its drag axis can become coupled in unstable manner with the resilient movements or deformation modes of the airframe, in particular the oscillations of the helicopter when standing on the ground via its landing gear: this is the origin of the so-called "ground resonance" phenomenon that can be dangerous for the aircraft when the resonant frequency of the oscillations of the blades about their drag axes is close to one of the resonant frequencies of the oscillations of the aircraft on its landing gear.

It should be observed that in the field of rotorcraft, other resonance phenomena are known under the terms "air resonance" and "drive train resonance".

The remedies to resonance phenomena due to the movements of the blades of a rotorcraft rotor consist in damping the movements of the blades relative to their drag axes by means of a damper type device.

Such dampers comprise resilient return means of determined stiffness and damping characteristics for opposing the resonance phenomena, in particular ground resonance and drive train resonance, that appear in particular on helicopters.

When drag movements of the blades of the rotor are excited, the blades depart from their equilibrium positions and may become distributed non-uniformly in the circumferential direction, thereby creating an unbalance by moving the center of gravity of the rotor away from its axis of rotation. Furthermore, the blades that have departed from their equilibrium positions then oscillate about their positions at a frequency $\omega_\delta$, which is the resonant frequency of the blades in drag, also known as the first drag mode or the resonant mode in drag.

If $\Omega$ is the frequency of rotation of the rotor, it is known that the helicopter fuselage is thus excited at the frequencies $|\Omega \pm \omega_\delta|$.

When standing on the ground via its landing gear, the fuselage of the helicopter constitutes a mass system suspended above the ground by a spring and a damper in each undercarriage. The fuselage resting on its landing gear is thus mainly characterized by its resonant modes of vibration in roll and in pitching. There is a risk of instability on the ground when the excitation frequency of the fuselage on its landing gear is close to the resonant frequency of oscillation $|\Omega+\omega_\delta|$ or $|\Omega-\omega_\delta|$, which corresponds to the phenomenon known as ground resonance. To avoid instability, it is known firstly to attempt to avoid those frequencies intersecting, and if such intersection cannot be avoided, then it is necessary to damp the fuselage on its landing gear and also the blades of the main rotor in their drag movements.

Consequently, the stiffness of the drag dampers of the blades of a main rotor needs to be selected so that the resonant frequency of the blades in drag lies outside a potential zone of ground resonance, while also providing sufficient damping, since when the speed of rotation of the rotor passes through the critical speed where resonant frequencies intersect, both when speeding up and when slowing down the rotor, the movements of the blades must be damped sufficiently to avoid entering into resonance.

That is why drag dampers with resilient return means of determined stiffness are also known as frequency adapters.

In general, the stiffness of a damper associated with a blade introduces equivalent angular stiffness opposing the angular movements of the blade relative to the hub about its drag axis. It is thus possible to increase the frequency of the resonant mode of the blades in drag so as to move this frequency away from the two above-mentioned resonance phenomena.

The equivalent angular stiffness is proportional to the square of the lever arm between the damper and the drag axis of the blade, i.e. the distance between the drag axis and the axis passing through the centers of the two ball joints of the damper, where ball joints are necessary in this application.

Document FR 2 653 405 describes two different configurations for such dampers.

Thus, according to that document, the hub of a rotor comprises an annular central portion, an intermediate portion having one cavity per blade, and then a peripheral portion.

Each blade is then secured via its root to a cuff that is fastened to a laminated spherical abutment arranged in one of said cavities.

In addition, in a first embodiment, one rotary damper per blade is secured to the peripheral portion of the hub. The rotary damper is then a return member incorporating damping as a result of shear in a viscoelastic material presenting a high degree of remanence to deformation and extending between a stationary strength member and a movable strength member.

It should be observed that document FR 2 592 449 presents a rotary damper having a return member that uses a fluid.

In order to be able to damp the drag movement of a blade, the rotary damper is connected by a connecting rod to a blade cuff.

That first embodiment is suitable for rotorcraft having a rotor with three blades.

Since the lever arm of that device is relatively small, it is appropriate to implement a rotary damper that is overdimensioned and therefore bulky, which limits any possibility of use with a large number of blades.

Thus, for rotorcraft having a rotor with at least four blades, document FR 2 653 405 proposes a second embodiment.

In accordance with that second embodiment, a rotary damper is fastened inside each cuff, the rotary damper of a blade being connected to an adjacent blade by a connecting rod.

Compared with a more conventional configuration in which the dampers are interposed between the blades and the hub of the rotor, arranging the dampers between the blades serves to increase the lever arm between the dampers and the drag axes of the blades, and also causes two dampers per blade to participate in opposing ground resonance. The stiffness of each damper can therefore be limited accordingly, and one advantage that stems therefrom is a lower level of static force being introduced by mounting each of the dampers as an inter-blade adapter. Such a configuration is therefore very favorable for combating ground resonance.

However, the inter-blade configuration does not enable overall drag movements to be damped and requires drag abutments to be used in order to avoid damage on starting and above all on breaking the rotor. Furthermore, it may be necessary to take particular precautions in order to avoid entering into resonance with the drive train.

Consequently, the prior art provides two distinct and alternative embodiments, namely:
  a first arrangement of one rotary damper between the hub and a cuff; or
  a second arrangement of one rotary damper between two blades.

Each of those embodiments presents its own advantages and drawbacks.

The first arrangement is efficient in combating drive train resonance in particular. Nevertheless, it uses only one damper per blade. A failure or breakage of a damper can then be penalizing.

The second arrangement in fact has two dampers per blade, thereby increasing safety. However, collective drag movement of the blades takes place without stiffness and without damping, which can give rise to a problem of drive train resonance.

Depending on requirements, it is either the first arrangement or the second arrangement that is selected.

The state of the art also includes the following documents: EP 1 767 452; WO 94/15113; FR 2 929 675; and U.S. Pat. No. 4,580,945.

SUMMARY OF THE INVENTION

An object of the invention is thus to provide a damper that can be implemented safely and that is suitable for avoiding the appearance of drive train resonance, in particular.

According to the invention, a damper is provided with an inner end strength member and an outer end strength member that are tubular and coaxial, a return member being arranged between the inner end strength member and the outer end strength member.

This damper is remarkable in that the return member includes an intermediate strength member coaxial with the inner end strength member and the outer end strength member, the return member having first return means and second return means, the first return means being arranged between the outer end strength member and the intermediate strength member, the second return means being arranged between the inner end strength member and the intermediate strength member, one end strength member being secured to first connection means, said intermediate strength member being secured to second connection means, and the other end strength member being secured to third connection means.

Thus, one strength member may be connected to a first blade, another strength member may be connected to a second blade, and the third strength member may be connected to the hub. Thus, the damper is capable of providing damping and delivering stiffness both between two blades and also between a blade and the hub of a rotor.

In addition, the first return means may provide greater stiffness and less damping while the second return means provide less stiffness and greater damping, with this applying regardless of which members are connected to the various strength members.

Surprisingly, this damper presents the advantages of both of the above-mentioned arrangements.

It should be observed that the return means may be viscoelastic type means, presenting one or more blocks of elastomer, for example, or indeed they may be fluid type return means, as described in document FR 2 592 449.

In addition, the return means may be stressed in pivoting between two adjacent strength members or in translation between two adjacent strength members.

According to other aspects, the invention may include other characteristics.

For example, one end strength member is secured to first connection means, the intermediate strength member being secured to second connection means. The first connection means and the second connection means enable the associated strength members to be moved relative to a stationary strength member of the damper.

In addition, the outer end strength member surrounds the first return means and the intermediate strength member, at least in part.

Likewise, the intermediate strength member may surround the second return means and said inner end strength member, at least in part.

In another aspect, the first return means have first stiffness and damping characteristics, the second return means having second stiffness and damping characteristics, and the first characteristics differ from the second characteristics. Thus, the characteristics of the return means are adapted as a function of the associated strength member and its function.

In addition to a damper, the invention provides a rotor having a hub and a plurality of blades, each blade having a lift surface and a cuff for connection to the hub. It should be observed that the cuff may be integral with the lift surface.

This rotor is remarkable in particular in that it includes at least one damper of the invention, or indeed one damper per blade, each damper being provided with an inner end strength member and an outer end strength member that are tubular and coaxial, a return member being arranged between the inner and outer end strength members, the return member including an intermediate strength member coaxial with the inner and outer end strength members, the return member having first return means and second return means, the first return means being arranged between the outer end strength member and the intermediate strength member, the second return means being arranged between the inner end strength member and the intermediate strength member, one of said inner end, outer end, and intermediate strength members being connected to the hub, another of said inner end, outer end, and intermediate strength members being connected to a first blade, and another of said inner end, outer end, and intermediate strength members being connected to a second blade adjacent to said first blade.

The return means stressed by a strength member connected to the hub and to a given blade then provide the stiffness to said given blade, while the return means arranged between two strength members connected to two adjacent blades provide the damping.

The rotor may include other characteristics.

In a first embodiment, the damper is secured to the hub and then connected to a first blade and to a second blade.

In a preferred first variant of this first embodiment, one end strength member of a damper is secured to the hub, the other end strength member is connected to a first blade, e.g. to its first cuff, and the intermediate strength member is connected to a second blade adjacent to the first blade, e.g. to the second cuff of the second blade. The damper is then fastened to the hub between the first and second blades.

The damper is thus secured to the hub via one end strength member, the other end strength member and the intermediate strength member being moved respectively by the first blade and by the second blade relative to the stationary end strength member that is secured to the hub.

Optionally, the outer end strength member of a damper is secured to the hub, the inner end strength member being connected to the first blade.

In a second variant of this first embodiment, one end strength member of a damper is secured to a first blade, the other end strength member is connected to a second blade adjacent to the first blade, and the intermediate strength member is connected to the hub.

Thus, the damper is always fastened to the hub. Nevertheless, the stationary strength member secured to the hub is constituted by the intermediate strength member and not by one of the end strength members, unlike the first variant of the first embodiment.

In a second embodiment, the damper is secured to a first blade and is then connected to the hub and to a second blade.

In a first variant of the second embodiment, one end strength member of a damper is secured to a first blade, the other end strength member is connected to the hub, and the intermediate strength member is connected to a second blade adjacent to the first blade.

The damper is thus secured to the first blade via one end strength member, the other end strength member and the intermediate strength member being suitable for being moved relative to the stationary end strength member that is secured to the first blade.

In a second variant of the second embodiment, one end strength member of a damper is secured to a first blade, the other end strength member is connected to a second blade adjacent to the first blade, and the intermediate strength member is connected to the hub.

Finally, in a third variant of the second embodiment, an intermediate strength member of a damper is secured to a first blade, one end strength member is connected to the hub, the other end strength member being connected to a second blade adjacent to the first blade.

The present invention also provides a method of fabricating the above-mentioned device.

BRIEF DESCRIPTION OF THE DRAWINGS

The invention and its advantages appear in greater detail from the following description of embodiments given by way of illustration and with reference to the accompanying figures, in which:

FIG. 1 shows a damper of the invention in which the return means are stressed by relative movement in pivoting;

FIG. 2 shows a damper of the invention in which the return means are stressed by relative movement in translation;

FIG. 3 is a diagram explaining a first variant of the first embodiment of a rotor having dampers that are stressed by relative movement in pivoting, being connected to the hub via their outer end strength members;

FIG. 4 is a diagram explaining the first variant of the first embodiment of a rotor having dampers that are stressed by movement in translation, connected to the hub via their outer end strength members;

FIG. 5 is a diagram explaining the second variant of the first embodiment of a rotor having dampers stressed by relative movement in pivoting, connected to the hub via their outer end strength members;

FIG. 6 is a diagram explaining the third variant of the first embodiment of a rotor;

FIG. 7 is a diagram explaining the first variant of the second embodiment of a rotor;

FIG. 8 is a diagram explaining the second variant of the second embodiment of a rotor; and FIG. 9 is a diagram explaining the third variant of the second embodiment of a rotor.

DETAILED DESCRIPTION OF THE PREFERRED EMBODIMENTS

Elements that are present in more than one of the figures are given the same references in each of them.

FIG. 1 shows a damper 10 of the invention.

This damper 10 comprises an inner end strength member 20, a tubular strength member, e.g. extending along an axis of symmetry AX. The damper 10 also includes an outer end strength member 30 likewise of tubular shape, for example, and extending along the axis AX. Under such circumstances, the inner end strength member 20 and outer end strength members 30 are coaxial.

In addition, the outer end strength member 30 surrounds the inner end strength member 20 at least in part, with a return member 40 being arranged between said outer and inner end strength members 30 and 20.

The return member 40 then comprises first return means 41, second return means 42, and an intermediate strength member 43 inserted between the outer end strength member 30 and the inner end strength member 20. Under such circumstances, the first return means 41 are arranged between the outer end strength member 30 and the intermediate strength member 43, with the second return means 42 being arranged between the inner end strength member 20 and the intermediate strength member 43. It can thus be understood that the outer end strength member 30 surrounds the intermediate strength member 43 at least in part, the intermediate strength member 43 surrounding the inner end strength member 20, at least in part.

Each strength member is thus suitable for moving relative to another strength member by stressing the first and/or second return means.

Each return means may comprise one or more blocks of elastomer, for example, with the arrangement of the return means relying on conventional techniques.

In a variant, return means may implement a fluid co-operating with vanes on the associated strength members, in accordance with the teaching of document FR 2 592 449, for example.

Furthermore, the first return means 41 have first stiffness and damping characteristics and the second return means 42 have second stiffness and damping characteristics, the first and second characteristics differing from one another so as to enable them to be adapted as required.

The damper 10 thus has three distinct strength members, namely an inner end strength member 20, an intermediate strength member 43, and an outer end strength member 30, with each pair of adjacent and distinct strength members being separated by respective return means.

The damper may then include connection means so that each return means is stressed by the relative movement of the strength members co-operating with that return means as a result of being stressed by an external element. For example, two of the strength members may be provided with respective connection means, the last strength member being held in a stationary position by connection means of the position-maintaining type.

Thus, one end strength member may be secured to first connection means, the intermediate strength member being secured to second connection means, and the other end strength member being secured to third connection means.

With reference to FIG. 1, in a preferred embodiment, the inner end strength member 20 is secured to first connection means 21 suitable for being hinged to a first connecting rod, the intermediate strength member 43 being secured to second connection means 44. The outer end strength member 30 is then provided with third connection means 31.

The connection means shown in FIG. 1 are of the type comprising a connection plate or lug. Nevertheless, it is possible, by way of example, to use adhesive means, welding means, screw-fastener means, or any other method. For example, the third connection means may be connected by adhesive or by a bead of welding.

As shown in FIG. 1, the damper 10 is suitable for use as a rotary damper, i.e. to damp pivoting movements.

Pivoting of the first connection means 21 about the axis AX along double-headed arrow F1 gives rise to identical pivoting of the inner end strength member 20. The second return means 42 are then stressed by shear stresses.

Similarly, pivoting of the second connection means 44 about the axis AX along double-headed arrow F2 gives rise to identical pivoting of the intermediate strength member 43. The first return means 41 and the second return means 42 are then stressed by shear stresses.

As shown in FIG. 2, the damper 10 may be used as a linear damper, i.e. to damp linear movements.

Movement in translation of the first connection means 21 along the axis AX along double-headed arrow F3 gives rise to identical movement in translation of the inner end strength member 20. The second return means 42 are then stressed in shear.

Similarly, movement in translation of the second connection means 44 along the axis AX along double-headed arrow F4 gives rise to identical movement in translation of the intermediate strength member 43. The first return means 41 and the second return means 42 are then both stressed in shear.

In addition to a damper 10, the invention relates to a rotor fitted with said damper.

FIG. 3 shows a rotor 1 having a rotary hub 2, the rotor 1 having a plurality of blades 3, 4, 5, and 6, each hinged to the hub 2.

Conventionally, each blade 3, 4, 5, and 6 has a lift surface 3", 4", 5", or 6" and a cuff 3', 4', 5', or 6' for connection to the hub 2, each cuff 3', 4', 5', or 6' possibly being integral with the lift surface 3", 4", 5", or 6".

Furthermore, the rotor 1 includes at least one damper 10 of the invention, e.g. one damper 10 per blade 3, 4, 5, and 6.

In the first embodiment as shown in FIGS. 3 to 6, a damper 10 is secured to the hub 2 via one of its strength members and it is then connected to the two adjacent blades via its other two strength members.

In the first variant of the first embodiment, as shown in FIGS. 3 to 5, one end strength member of a damper 10 is secured to the hub 2, the other end strength member being connected to a first blade 3, with the intermediate strength member being connected to a second blade 4 that is adjacent to the first blade 3.

In the alternative of FIG. 3, the outer end strength member 30 of a damper 10 is secured to the hub 2 via third connection means, i.e. by adhesive, welding, or screw-fastening a linking lug, for example, or by any other method. Under such circumstances, the inner end strength member 20 is connected via its first connection means 21 to the first cuff 3' of the first blade 3, while the intermediate strength member 43 is connected via its second connection means 44 to the second cuff 4' of the second blade 4, a first hinge connecting rod providing the connection between the first connection means 21 and the first cuff 3' and a second hinged connecting rod providing the connection between the second connection means 44 and the second cuff 4'.

The damper 10 may be a damper of the type that moves in pivoting as shown in FIG. 3 or of the type that moves in translation as shown in FIG. 4 where the outer end strength member is secured to a support arm 2' of the hub 2.

With reference to the second variant of FIG. 5, the inner end strength member 20 of a damper 10 is connected or secured to the hub 2 by conventional third connection means. Under such circumstances, the outer end strength member 30 is connected via its connection means and a hinged connecting rod to the first cuff 3' of the first blade 3 while the intermediate strength member 43 is connected via its connection means and a hinged connecting rod to the second cuff 4' of the second blade 4.

In the third variant of the first embodiment, as shown in FIG. 6, the intermediate strength member 43 of a damper 10 is connected or secured to the hub 2, the outer end strength member 30 being connected to a first blade 3, the inner end strength member 20 being connected to a second blade 4 that is adjacent to the first blade 3.

In the second embodiment shown in FIGS. 7 to 9, a damper 10 is connected or secured to a blade via one of its strength members and is then connected to an adjacent blade and to the hub via its other two strength members.

In the first variant of the second embodiment shown in FIG. 7, one end strength member of a damper is connected or secured to a first blade 3, the other end strength member being connected to the hub 2, with the intermediate strength member 43 being connected to a second blade 4 adjacent to said first blade 3.

For example, a damper 10 is secured to a first blade 3 via its outer end strength member 30 using conventional means. Thereafter, the inner end strength member 20 is connected to the hub 2 via hinged connection means to a connecting rod, for example, the inner strength member 43 being connected to a second blade 4 adjacent to the first blade 3 via hinged connection means to a connecting rod, for example.

In the second variant of the second embodiment as shown in FIG. 8, one end strength member of a damper is connected or secured to a first blade, the other end strength member being connected to a second blade adjacent to said first blade, and the intermediate strength member being connected to the hub.

For example, a damper 10 is secured to a first blade 3 via its inner end strength member 20, using conventional means. Thereafter, the outer end strength member 30 is connected to a second blade 4 adjacent to the first blade 3 via a hinged connection to a connecting rod, for example, the intermediate strength member 43 being connected to the hub 2 via hinged connection means to a connecting rod, for example.

In the third variant of the second embodiment as shown in FIG. 9, an intermediate strength member 43 of a damper 10 is connected or secured to a first blade 3, one end strength member being connected to the hub 2 and the other end strength member being connected to a second blade 4 adjacent to the first blade 3.

By way of example, a damper 10 is secured to a first blade 3 by its intermediate strength member 43 using conventional means. Thereafter, the outer end strength member 30 is connected to a second blade 4 via hinged connection means to a connecting rod, for example, the inner end strength member 20 being connected to the hub 2 via hinged connection means to a connecting rod, for example.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A damper provided with an inner end strength member and an outer end strength member that are tubular and coaxial, a return member being arranged between the inner end strength member and the outer end strength member, wherein said return member includes an intermediate strength member coaxial with the inner and outer end strength members, said return member having first return means and second return means, said first return means being arranged between the outer end strength member and said intermediate strength member, said second return means being arranged between the inner end strength member and said intermediate strength member, one end strength member being secured to first connection means, said intermediate strength member being secured to second connection means, and the other end strength member being secured to third connection means.

2. A damper according to claim 1, wherein the outer end strength member surrounds said first return means and said intermediate strength member, at least in part.

3. A damper according to claim 1, wherein the intermediate strength member surrounds said second return means and said inner end strength member, at least in part.

4. A damper according to claim 1, wherein the first return means have first stiffness and damping characteristics, the second return means having second stiffness and damping characteristics, and the first characteristics differ from the second characteristics.

5. A rotor provided with a hub and a plurality of blades, wherein the rotor includes at least one damper according to claim 1, each damper being provided with an inner end strength member and an outer end strength member that are tubular and coaxial, a return member being arranged between the inner and outer end strength members, said return member including an intermediate strength member coaxial with the inner and outer end strength members, said return member having first return means and second return means, said first return means being arranged between the outer end strength member and said intermediate strength member, said second return means being arranged between the inner end strength member and said intermediate strength member, one of said inner end, outer end, and intermediate strength members being connected to the hub, another of said inner end, outer end, and intermediate strength members being connected to a first blade, and another of said inner end, outer end, and intermediate strength members being connected to a second blade adjacent to said first blade.

6. A rotor according to claim 5, wherein one end strength member of a damper is secured to said hub, the other end strength member is connected to a first blade, and the intermediate strength member is connected to a second blade adjacent to said first blade.

7. A rotor according to claim 6, wherein said outer end strength member of a damper is secured to said hub, the inner end strength member being connected to said first blade.

8. A rotor according to claim 5, wherein one end strength member of a damper is secured to a first blade, the other end strength member is connected to a second blade adjacent to said first blade, and the intermediate strength member is connected to said hub.

9. A rotor according to claim 5, wherein one end strength member of a damper is secured to a first blade, the other end strength member is connected to said hub, and the intermediate strength member is connected to a second blade adjacent to said first blade.

10. A rotor according to claim 5, wherein one end strength member of a damper is secured to a first blade, the other end strength member is connected to a second blade adjacent to said first blade, and the intermediate strength member is connected to said hub.

11. A rotor according to claim 5, wherein an intermediate strength member of a damper is secured to a first blade, one end strength member is connected to said hub, the other end strength member being connected to a second blade adjacent to said first blade.

* * * * *